US010666924B2

(12) United States Patent
Matsushita et al.

(10) Patent No.: US 10,666,924 B2
(45) Date of Patent: May 26, 2020

(54) VIRTUAL VIEWPOINT IMAGE GENERATION SYSTEM BASED ON CAPTURED IMAGES, VIRTUAL VIEWPOINT IMAGE GENERATION APPARATUS, AND METHOD OF CONTROLLING SAME

(71) Applicant: CANON KABUSHIKI KAISHA, Tokyo (JP)

(72) Inventors: Akihiro Matsushita, Tokyo (JP); Kiwamu Kobayashi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 74 days.

(21) Appl. No.: 15/477,425

(22) Filed: Apr. 3, 2017

(65) Prior Publication Data

US 2017/0293413 A1 Oct. 12, 2017

(30) Foreign Application Priority Data

Apr. 8, 2016 (JP) .................................. 2016-078436

(51) Int. Cl.
*H04N 13/243* (2018.01)
*G06T 7/00* (2017.01)
(Continued)

(52) U.S. Cl.
CPC ............. *H04N 13/243* (2018.05); *G06T 7/97* (2017.01); *G06T 15/205* (2013.01); *H04N 5/247* (2013.01);
(Continued)

(58) Field of Classification Search
CPC combination set(s) only.
See application file for complete search history.

(56) References Cited

U.S. PATENT DOCUMENTS 5,729,471 A * 3/1998 Jain ...................... H04N 13/139
725/131
5,850,352 A * 12/1998 Moezzi ................ H04N 13/139
345/419

(Continued)

FOREIGN PATENT DOCUMENTS

JP          2004246667 A        9/2004
JP          2005-174148 A       6/2005
JP          2005174148 A *      6/2005

OTHER PUBLICATIONS

Notification of Reasons for Refusal in Japanese counterpart application No. 2016-078436, dated Apr. 17, 2020 (4 pages).

(Continued)

*Primary Examiner* — Jamie J Atala
*Assistant Examiner* — Michael Robert Cammarata
(74) *Attorney, Agent, or Firm* — Carter, DeLuca & Farrell LLP

(57) ABSTRACT

A virtual viewpoint image generation system generates a virtual viewpoint image based on a plurality of captured images obtained by capturing an image capturing target region from a plurality of different directions, and position information relating to a virtual viewpoint position. The system comprises: a plurality of image capturing apparatuses; a daisy-chain-type topology network; an obtainment unit configured to obtain the position information relating to the virtual viewpoint position; and a generation unit configured to generate the virtual viewpoint image based on the position information and the data based on each captured image of the plurality of image capturing apparatuses obtained via the daisy-chain-type topology network.

11 Claims, 7 Drawing Sheets

(51) Int. Cl.
*H04N 21/218* (2011.01)
*H04N 7/18* (2006.01)
*H04N 5/247* (2006.01)
*G06T 15/20* (2011.01)
*H04N 13/111* (2018.01)
*H04N 21/2187* (2011.01)

(52) U.S. Cl.
CPC ............ *H04N 7/181* (2013.01); *H04N 13/111* (2018.05); *H04N 21/2187* (2013.01); *H04N 21/21805* (2013.01)

(56) References Cited

U.S. PATENT DOCUMENTS

| | | | |
|---|---|---|---|
| 10,008,027 B1* | 6/2018 | Baker | G06T 7/0051 |
| 2006/0083421 A1* | 4/2006 | Weiguo | G06K 9/32 |
| | | | 382/154 |
| 2010/0020068 A1* | 1/2010 | House | G06T 15/20 |
| | | | 345/419 |
| 2012/0254369 A1* | 10/2012 | Gillard | H04N 21/25891 |
| | | | 709/219 |
| 2013/0016097 A1* | 1/2013 | Coene | G06T 15/205 |
| | | | 345/419 |
| 2014/0013361 A1* | 1/2014 | Monari | H04N 5/2252 |
| | | | 725/62 |
| 2015/0054913 A1* | 2/2015 | Annau | G11B 27/11 |
| | | | 348/36 |
| 2015/0317822 A1* | 11/2015 | Haimovitch-Yogev | ...... |
| | | | H04N 5/247 |
| | | | 345/419 |
| 2015/0339523 A1* | 11/2015 | Tsunematsu | G06K 9/00362 |
| | | | 382/103 |
| 2015/0348580 A1* | 12/2015 | van Hoff | G11B 19/20 |
| | | | 348/38 |
| 2017/0078646 A1* | 3/2017 | Matsunobu | H04N 5/247 |
| 2017/0094259 A1* | 3/2017 | Kouperman | H04N 13/111 |
| 2018/0225840 A1* | 8/2018 | Ikeda | G06T 5/50 |
| 2018/0258616 A1* | 9/2018 | Kiyota | G06T 1/20 |
| 2018/0367788 A1* | 12/2018 | Haimovitch-Yogev | ...... |
| | | | G06T 7/11 |

OTHER PUBLICATIONS (Machine Translation by Google translate: https://translate.googleusercontent.com/translate_f) English translation of Notification of Reasons for Refusal in Japanese counterpart application No. 2016-078436, dated Apr. 17, 2020. (4 pages).

\* cited by examiner

VIRTUAL VIEWPOINT IMAGE GENERATION SYSTEM BASED ON CAPTURED IMAGES, VIRTUAL VIEWPOINT IMAGE GENERATION APPARATUS, AND METHOD OF CONTROLLING SAME

BACKGROUND OF THE INVENTION

Field of the Invention

The present invention relates to a technique of deriving an image processing parameter based on a plurality of captured images.

Description of the Related Art

In recent years, research and development such as for a system that uses a plurality of image capturing apparatuses such as cameras to perform capturing and generate a video by freely changing a viewpoint for example is proceeding, and application for sports or the like is expected. In such a system, processing such as overlapping or compositing video captured by the plurality of image capturing apparatuses may be performed. However, to suitably composite images obtained by the plurality of image capturing apparatuses, it is necessary to deform each image in accordance with a coordinate conversion parameter that depends on the position of each image capturing apparatus.

Accordingly, there is a method for installing markers or the like that are capturing targets in a stadium or the like, and performing correspondence between images of a plurality of image capturing apparatuses by recognizing a marker on a captured image. Japanese Patent Laid-Open No. 2005-174148 discloses a method of obtaining position information by installing a pattern for emitting light and receiving that light.

However, in a method for using dedicated markers to calculate image processing parameters, there is a problem in that work for the installation, capturing, recovery, and the like of markers is necessary, and effort and time is incurred.

SUMMARY OF THE INVENTION

A virtual viewpoint image generation system that generates a virtual viewpoint image based on a plurality of captured images obtained by capturing an image capturing target region from a plurality of different directions, and position information relating to a virtual viewpoint position, the system comprises: a plurality of image capturing apparatuses configured to capture the image capturing target region to obtain the plurality of captured images from the plurality of different directions; a daisy-chain-type topology network configured to communicate data based on each captured image of the plurality of image capturing apparatuses; an obtainment unit configured to obtain the position information relating to the virtual viewpoint position; and a generation unit configured to generate the virtual viewpoint image based on the position information relating to the virtual viewpoint position obtained by the obtainment unit and the data based on each captured image of the plurality of image capturing apparatuses obtained via the daisy-chain-type topology network.

The present invention provides a technique for enabling coordinate conversion parameters between captured images to be suitably derived.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Explanation is given in detail below, with reference to the drawings, of suitable embodiments of the invention. Note, the following embodiments are only examples and are not intended to limit the scope of present invention.

First Embodiment

As a first embodiment of a virtual viewpoint image generation system according to the present invention, explanation is given below of an example of an image processing system that processes video captured by a plurality of cameras installed at a stadium.

<System Configuration>

Figure 1:
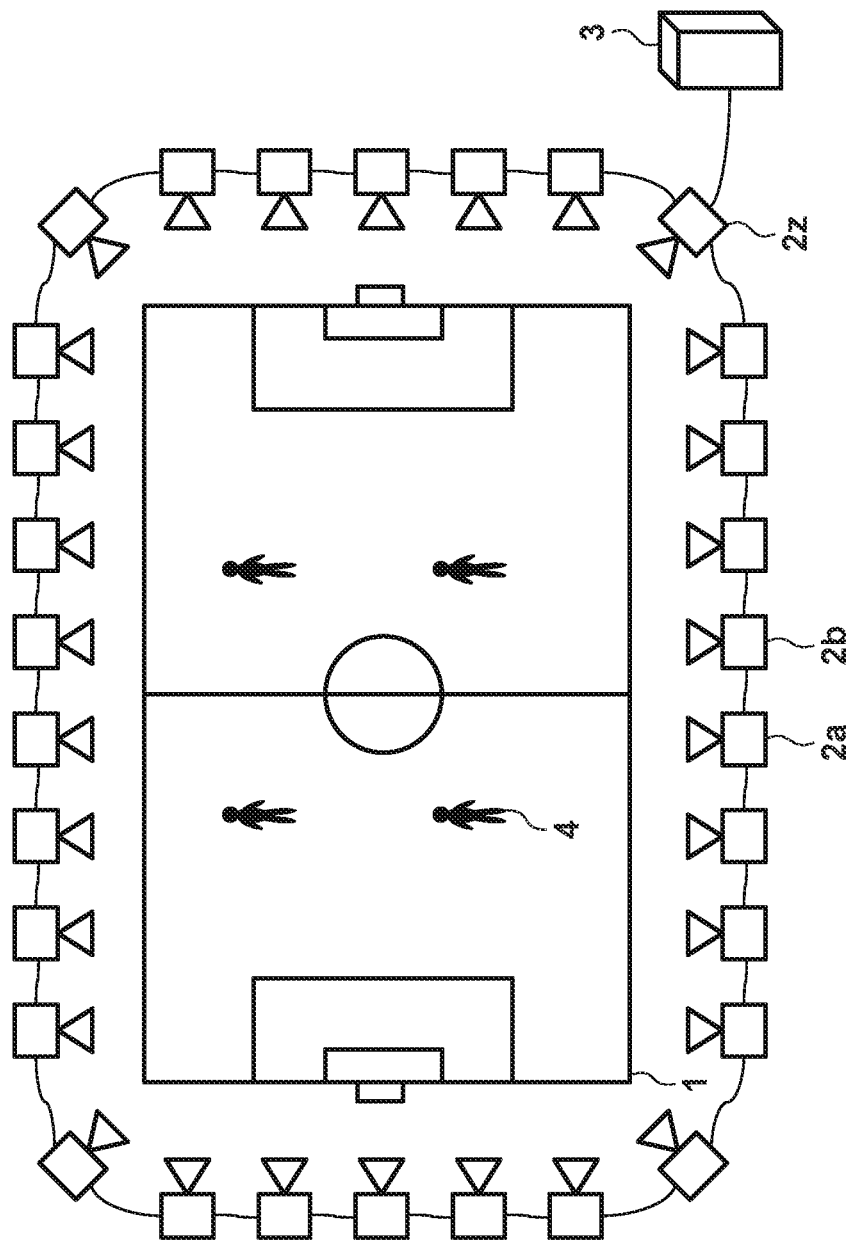
FIG. 1 is a view that illustrates an overview configuration of an image processing system.

FIG. 1 is a view that illustrates an overview configuration of an image processing system in the first embodiment. Surrounding a stadium 1 (means a field portion that is a flat surface region of the stadium here), many cameras 2 for capturing in a direction towards the center of the field (includes later-described cameras 2a, 2b and 2z) are arranged to be lined up. Each of the many cameras 2 is provided with input/output hardware for data transmission. The many cameras 2 are communicably connected via a ring-type network for example, and are configured to enable transfer of video (an image stream) to another camera via the network. Specifically, the many cameras 2 of the present embodiment transmit data based on video (an image stream) to another of the cameras 2 via a network that is based on a daisy-chain-type topology. By communicating data for generation of a virtual viewpoint image by using a network based on a daisy-chain-type topology in this way, it is possible to reduce the possibility of a communication data amount overflowing as compared to the case in which a bus-type topology is used for example. However, configuration may be taken to connect in accordance with a bus-type network topology or the like.

One of the many cameras 2 (a camera 2z) is connected to an image processing apparatus 3, and all video captured by the many cameras 2 is transferred to the image processing apparatus 3. It is assumed that a sport such as soccer, for example, is being performed in the stadium 1, and a plurality of humans are present in the stadium 1. Each of the many cameras 2 are performing capturing.

Figure 2:
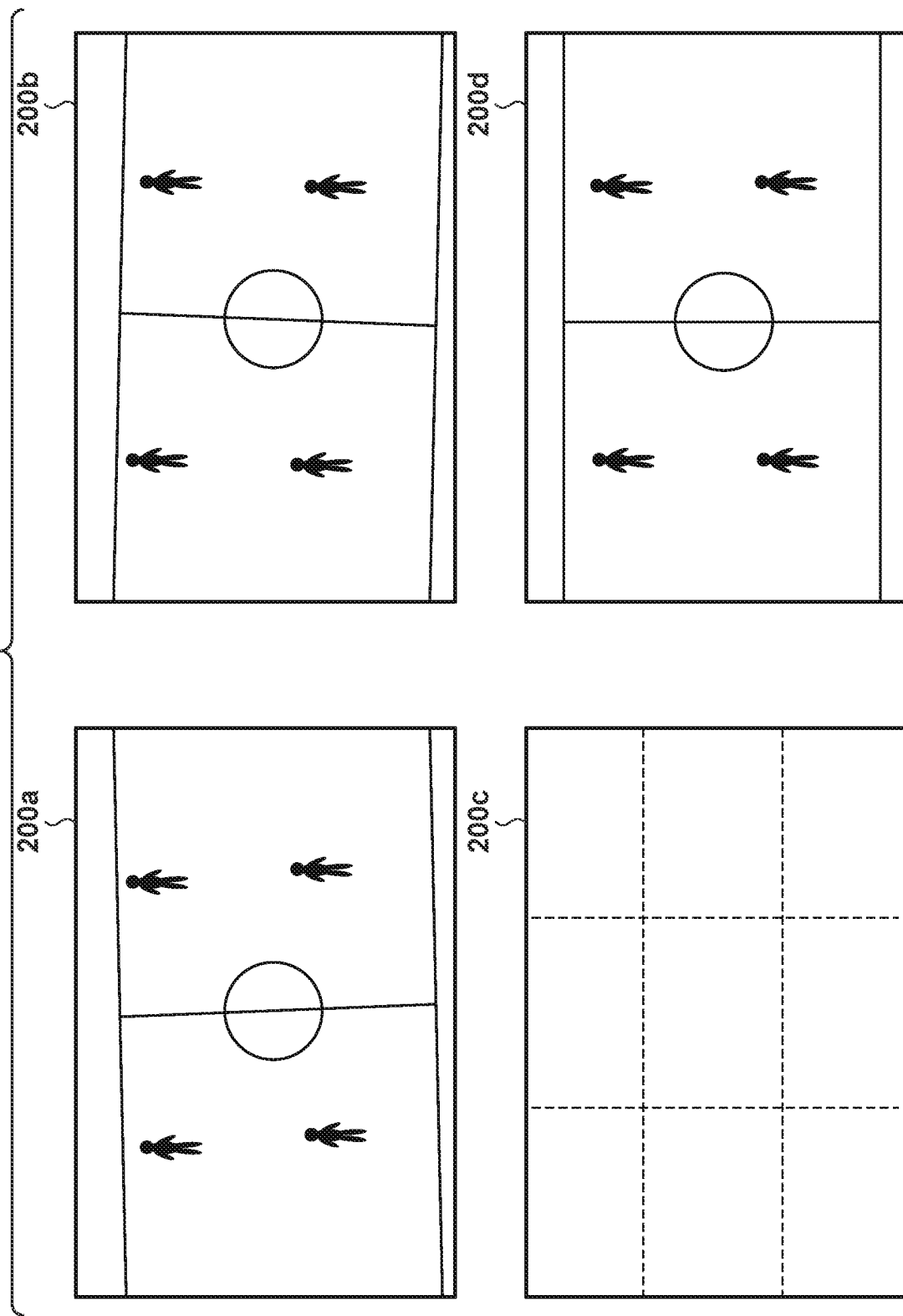
FIG. 2 is a view for explaining captured images and compositing of them.

FIG. 2 is a view that illustrates an example of images captured by two cameras (a camera 2a and a camera 2b). An image 200a illustrates an image captured by the camera 2a, and an image 200b illustrates an image captured by the camera 2b. As illustrated in FIG. 1, the camera 2a and the camera 2b are installed adjacent to one another, and images in which viewpoints are slightly different as in FIG. 2 are obtained.

An image captured by each camera is transmitted to the image processing apparatus 3 via the network. The image processing apparatus 3 uses a plurality of received images to perform calculation processing of the coordinate conversion parameters for overlapping the images captured by the cameras. For example, processing for calculating coordinate conversion parameters for overlapping a region of the ground of the stadium 1 that is an image captured by the camera 2a and a region of the ground of the stadium 1 that is an image captured by the camera 2b is performed. Here, explanation is given regarding an operation for calculating a coordinate conversion parameter.

<Image Processing Apparatus Configuration>

Figure 3:
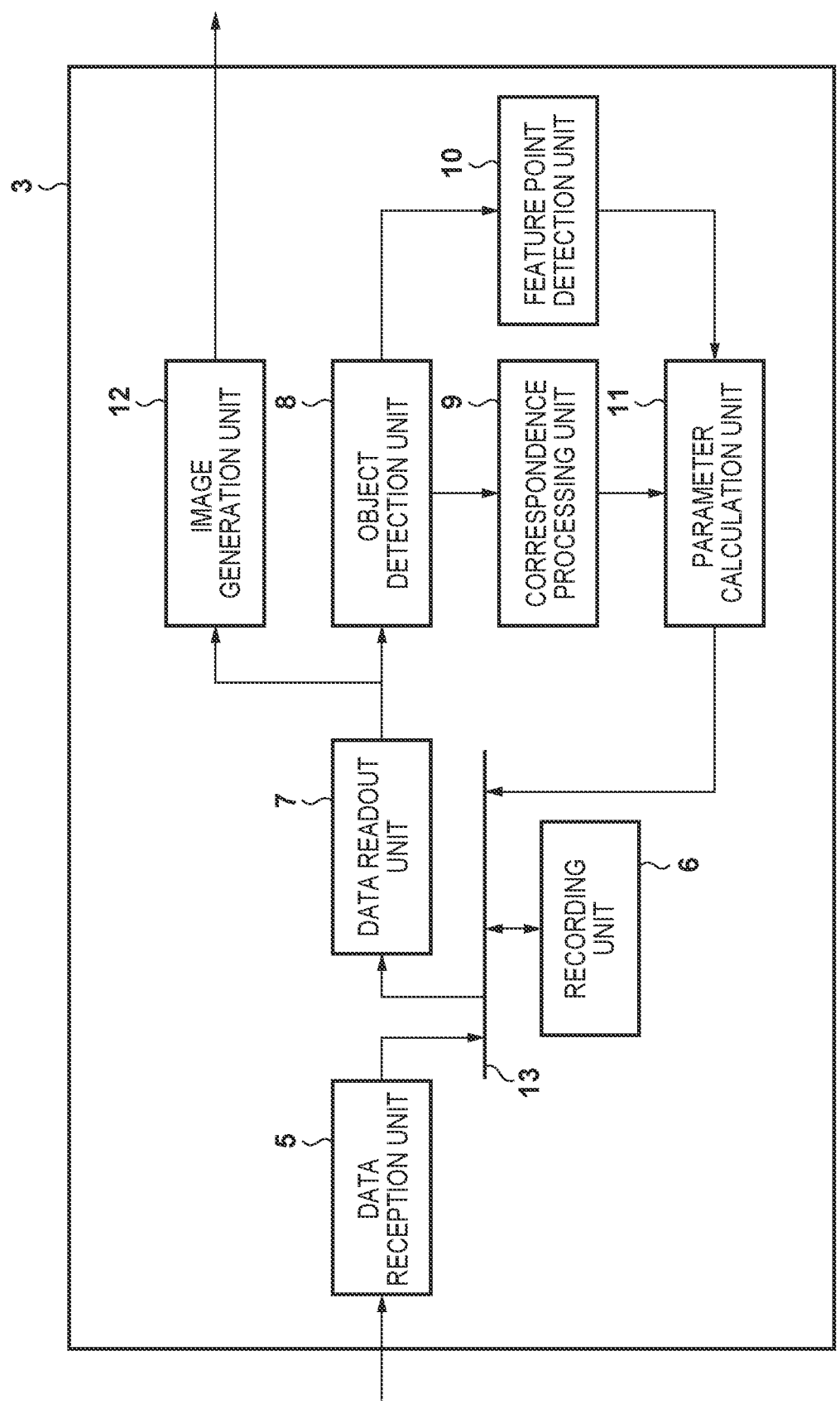
FIG. 3 is a block diagram that illustrates an internal configuration of an image processing apparatus 3.
Figure 7:
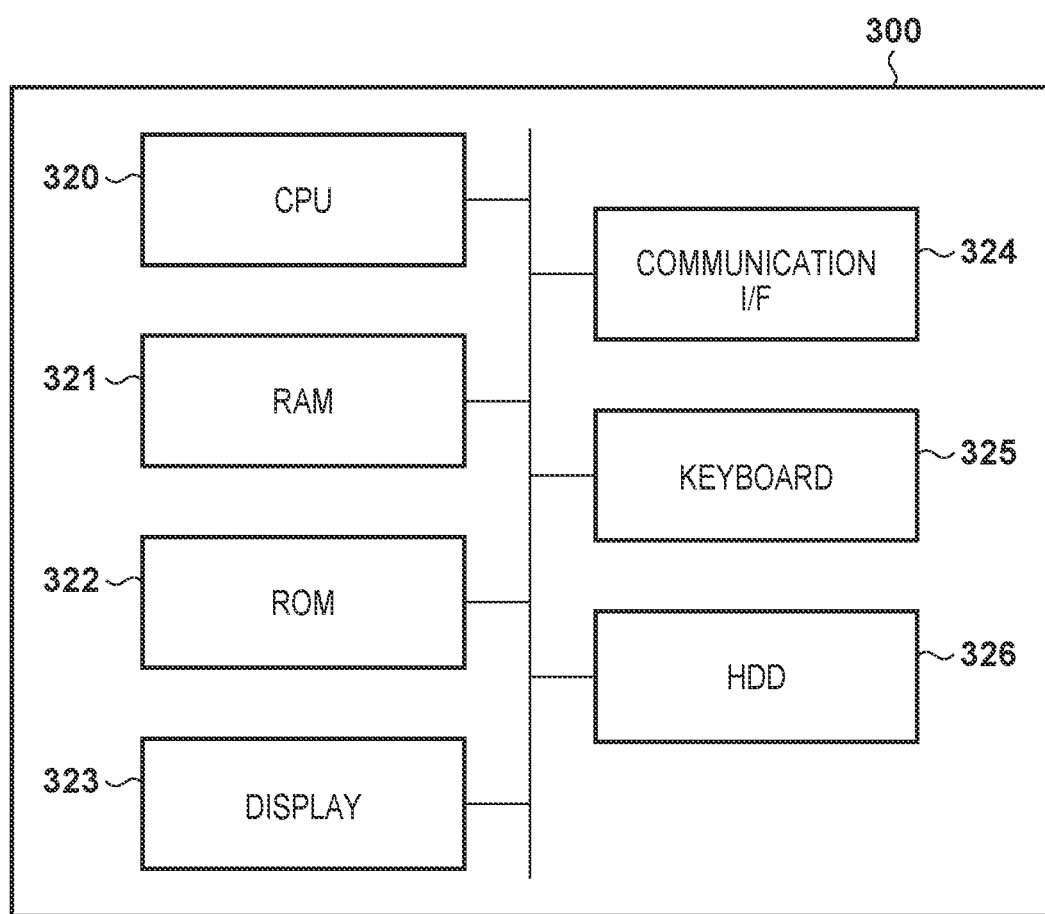
FIG. 7 is a hardware configuration diagram of a PC that configures an image processing apparatus.

FIG. 3 is a block diagram that illustrates an internal configuration of the image processing apparatus 3. FIG. 7 is a hardware configuration diagram of a PC that configures the image processing apparatus 3. Here, an example in which the image processing apparatus 3 is configured by a typical personal computer (PC) 300 is illustrated.

In the following explanation, explanation is given regarding a configuration for realizing each functional unit of the image processing apparatus 3 illustrated in FIG. 3 by a CPU executing a software program. However, configuration may be taken so that some or all of the functional units of the image processing apparatus 3 illustrated in FIG. 3 are processed by hardware such as an application specific integrated circuit (ASIC), an FPGA, or the like. Here, FPGA is an abbreviation of Field Programmable Gate Array.

A CPU 320 comprehensively controls the PC 300. The CPU 320 realizes each functional unit illustrated in FIG. 3 by executing a control program stored in a ROM 322 or a hard disk drive (HDD) 326, for example.

The HDD 326 stores various control programs or an application program used by the PC 300, for example. In addition, it saves various information relating to the various control programs or the application program. In addition, a RAM 321 is also used to store various information temporarily.

A keyboard 325 is a functional unit for accepting data input from a user. In addition, a display 323 is a functional unit for providing various information to a user. Note that the keyboard 325 or the display 323 are not necessary elements. In other words, the PC 300 may be a configuration that is not provided with the keyboard 325 or the display 323.

A communication interface (I/F) 324 is an interface for connecting to the camera 2z illustrated in FIG. 1, and is an interface for wired communication or wireless communication for example.

A data reception unit 5 receives respective pieces of image data from the plurality of cameras 2 via the network. Modules such as the data reception unit 5 and a data readout unit 7 are connected to a recording unit 6 via a data bus 13, and reading or writing of data is performed as necessary. The recording unit 6 is configured by, for example, the HDD 326 or an SSD (Solid State Drive), a combination of these, or the like. Image data received by the data reception unit 5 is first saved in the recording unit 6 via the data bus 13.

The data readout unit 7 reads out images necessary for calculating image conversion parameters between cameras from the recording unit 6. For example, it reads an appropriate frame image (for example an image 200a) from an image captured by the camera 2a. In addition, it reads a frame image (for example an image 200b) for the same timing as that of the image of the camera 2a, from an image captured by the camera 2b. It transmits the read images to an object detection unit 8. Note that, if reading of frame images of the same timing is attempted but the movement of an object that is a capturing target is slow, they may be frame images that have a certain amount of time difference.

The object detection unit 8 is a functional unit that performs detection of objects for each of the two received images. A publicly known method that uses background difference information, for example, is used for the object detection. More specifically, this is a method that takes something obtained by statistical processing such as averaging on images for a fixed interval of the past as background data, and sets a difference with a current image as an object. Because an object detection method that uses background difference information is generally well known, a detailed explanation here is omitted. Other than this, various methods for object detection such as methods that uses feature amounts or machine learning are known, and any method can be used.

It is assumed that, in the object detection unit 8, for each image of the camera 2a and the camera 2b, four humans appearing in the respective image 200a and image 200b are set as objects, and the positions and shapes thereof are detected. The object information detected by the object detection unit 8 is transmitted to a correspondence processing unit 9 and a feature point detection unit 10.

The correspondence processing unit 9 makes correspondences between objects detected in each image of the camera 2a and the camera 2b (generates correspondence information that indicates correspondences). As a method of obtaining correspondence information, execution is performed by using a publicly known block matching method, for example. In a block matching method, a tiny portion in an image is extracted as a block such as a rectangle, and a degree of matching of the block is evaluation in two objects. The degree of matching is a total of a luminance difference for each pixel in a block, for example. If the degree of matching is greater than a constant value, it is determined that the two blocks correspond, in other words that the two objects correspond. Other than this, various methods that combine feature point detection, feature amount calculation, a matching process, and the like can be used as a method of correspondence.

Figure 4:
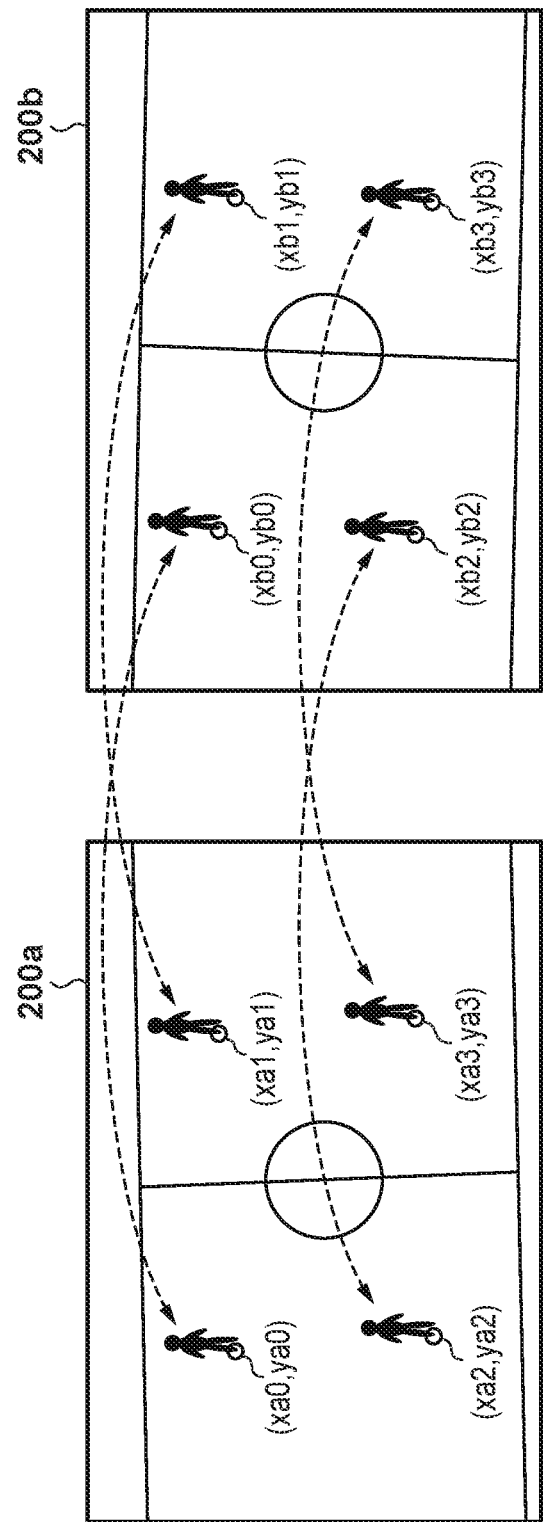
FIG. 4 is a view for explaining correspondence of objects in two images.

Here, as illustrated in FIG. 4, it is assumed that correspondences between the four objects (humans) that appear in the two images of the camera 2a and the camera 2b have been correctly identified as indicated by dashed lines.

The feature point detection unit 10 detects feature points of each object detected by the object detection unit 8. Here, in particular coordinates for a bottom edge of an object (a human here) are detected. This is because, typically, a foot portion is present at a position closest to a field plane of the stadium in an image of human, and there is a high possibility that a foot portion is at bottom edge coordinates of an object. Because the shape of an object in accordance with the object detection unit 8 is known, the bottom edge coordinates can be detected by simple coordinate inspection processing.

Here, as illustrated in FIG. 4, it is assumed that the bottom edge coordinates of the four objects in the image 200a captured by the camera 2a are respectively detected as (xa0, ya0), (xa1, ya1), (xa2, ya2), and (xa3, ya3). Similarly, it is assumed that the bottom edge coordinates of each object in the image 200b captured by the camera 2b are respectively detected as (xb0, yb0), (xb1, yb1), (xb2, yb2), and (xb3, yb3). Note that, a method of detecting the bottom edge of an object may also be a method of attaching markers or the like to shoes for example, and detecting the markers.

In FIG. 4, the bottom edge coordinates of each object is detected at a tip of a foot of a left side in an image. In other words, the bottom edge coordinates among corresponding objects are in a state in which they are correctly corresponded. Meanwhile, because the viewpoints of the camera 2a and the camera 2b differ as described above, there may be cases in which bottom edge coordinates among corresponding objects are not correctly corresponded.

Figure 5:
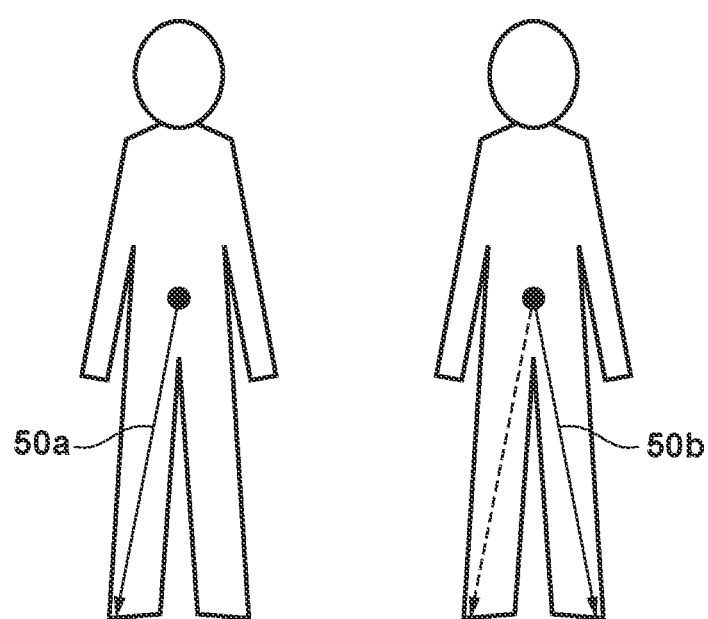
FIG. 5 is a view for explaining modification processing of the correspondence of objects.

FIG. 5 is a view for explaining modification processing of the correspondence of objects. Here, an example of a case in which bottom edge coordinates for an object are not correctly corresponded is described. For explanation, in FIG. 5, a vector from a centroid as a reference point of the object to the bottom edge coordinates is also illustrated.

In an object of the image 200a, the bottom edge is an end portion of a foot on the left side of the image, as illustrated by a vector 50a. In contrast, in an object of the image 200b, the bottom edge is an end portion of a foot on the right side of the image, as illustrated by a vector 50b.

In the feature point detection unit 10, an inspection of a detection result is performed to support a case in which feature points are detected at different positions in two images in this manner. Firstly the vector 50a and a vector 50b are calculated, and a degree of matching of the two is inspected. A threshold value, as a predetermined difference for determining the degree of matching is predetermined by considering conditions for each system. For example, an appropriate value changes in accordance with conditions such as the size of a photographic subject, a level of noise of an image, and an amount of parallax of a camera.

If a case such as that illustrated in FIG. 5 occurs and it is determined that a degree of matching is low as a result of a comparison, detection of bottom edge coordinates of the object of the image 200b is reperformed. For example, as illustrated by the dashed line vector of FIG. 5, the vector 50a is fitted to the object of the image 200b. An inspection region is limited to a vicinity of the end point of the vector 50a, and detection of the bottom edge coordinates is executed again. As a result thereof, it is possible to reset the end portion of the left foot as the bottom edge coordinates in the object of the image 200b.

Note that the centroid of the object is used as the start point of the vector, but other than this, for example the head of a human, a marker attached to the human may be detected instead. As another example, configuration may be taken not to use the object if the degree of matching between the vector 50a and the vector 50b is low. In such a case, a processing load is reduced because re-detection as described above is not executed.

The correspondence information of the object processed in the correspondence processing unit 9 and the information of the bottom edge coordinates of the object processed in the feature point detection unit 10 are transmitted to a parameter calculation unit 11.

<Derivation of Coordinate Conversion Parameters>

The parameter calculation unit 11 performs calculation processing for coordinate conversion parameters for overlapping the images captured by each camera. Here, explanation is given regarding processing for calculating coordinate conversion parameters for overlapping a region of the ground of the stadium 1 that is an image captured by the camera 2a and a region of the ground of the stadium 1 that is an image captured the camera 2b. In the following explanation, explanation is given regarding an example of calculating elements of a nomography matrix H as the coordinate conversion parameters, but configuration may be taken to calculate other coordinate conversion parameters.

Here, it is assumed that the field of the stadium 1 can be approximated as a flat surface. In addition, it is assumed that the bottom edge of each object (the foot portion of a human) is on the field. The parameter calculation unit 11 uses the information of the bottom edge coordinates of each object to calculate elements of the homography matrix H which is a coordinate conversion parameter. Regarding coordinate conversions in accordance with the homography matrix H, it is public knowledge and thus a detailed explanation thereof is omitted.

In FIG. 4, an equation for converting, by the homography matrix H, bottom edge coordinates for an object of the image 200a (xa0, ya0) to bottom edge coordinates of an object of the image 200b (xb0, yb0) is as follows.

$$\begin{pmatrix} xb0 \\ yb0 \\ 1 \end{pmatrix} = H \begin{pmatrix} xa0 \\ ya0 \\ 1 \end{pmatrix} \quad (1)$$

Here H is the homography matrix. The homography matrix is a matrix of 3 rows by 3 columns and has 9 elements, but because one element is "1", the number of substantial elements (parameters) is 8.

Equations for performing homography conversions similarly for the bottom edge coordinates of the three other objects in FIG. 4 are as follows.

$$\begin{pmatrix} xb1 \\ yb1 \\ 1 \end{pmatrix} = H \begin{pmatrix} xa1 \\ ya1 \\ 0 \end{pmatrix} \quad (2)$$

$$\begin{pmatrix} xb2 \\ yb2 \\ 1 \end{pmatrix} = H \begin{pmatrix} xa2 \\ ya2 \\ 1 \end{pmatrix} \quad (3)$$

$$\begin{pmatrix} xb3 \\ yb3 \\ 1 \end{pmatrix} = H \begin{pmatrix} xa3 \\ ya3 \\ 1 \end{pmatrix} \quad (4)$$

From Equations (1) to (4), eight independent equations are obtained. As described above, there are 8 parameters of the homography matrix. Therefore, each parameter is calculated by solving simultaneous equations in accordance with these 8 equations, and it is possible to obtain the homography matrix H. The simultaneous equations can be solved by using a publicly known Gauss-Jordan method, for example.

The parameter calculation unit 11 saves each parameter of the calculated homography matrix H in the recording unit 6. If parameters are already saved, they are overwritten and updated with new values.

In the processing described above, four pairs of values of bottom edge coordinates are used to calculate the parameters. As another method, more pairs may be used. In such a case, processing such as calculating a total of error of results of performing coordinate conversion on each pair of coordinate values and optimizing parameters such that this value becomes a minimum is performed, for example. Actually, there is a tendency in that the more pairs of coordinates there are the more the precision increases. Because a number of pairs required in order to obtain a desired precision changes in accordance with conditions such as a degree of image noise, an amount of parallax of a camera, or the like for example, configuration may be taken to predetermine after considering the conditions for each system.

In addition, the pairs of the bottom edge coordinates may be selected from frame images at one timing, or may be selected from frame images of a plurality of timings—in other words frame images of the past. However, in images of the past for which a long interval has passed, a possibility that misalignment with a current camera position occurs becomes higher. Therefore, configuration may be taken such that, if pairs of coordinates are obtained from a new frame image and the number of pairs is not greater than or equal to a predetermined number (for example 4), pairs of coordinates for an amount of a deficiency may be obtained from past frame images in an order from the newest in terms of time. Note that, in the above explanation, 4 pairs were used all as the pairs of bottom edge coordinates, but they may be used in conjunction with pairs of feature points such as a corner or an intersection point of lines of the stadium.

Furthermore, there are cases in which for example an optical distortion caused by a lens characteristic or the like is included in an image, depending on the camera. In such a case, a weighting may be changed in accordance with the region of the image. For example, configuration may be taken to divide the image into a plurality of regions (9 regions here) as illustrated by the dashed lines of the image 200c, and decide in advance a number of coordinate pairs to obtain inside each region.

Typically, the closer to an edge of an image (going away from a center of an optical axis of the optical system), the greater the distortion becomes. Therefore, configuration may be taken to set a number of coordinate pairs to obtain in a region close to an edge of the image to be smaller than a number to obtain in a central portion of the image, and have processing that emphasizes the precision of overlapping the central portion of the image.

The above explained processing is also executed with adjacent cameras other than the combination of the camera 2a and the camera 2b. As a result thereof, homography matrices H for adjacent cameras is calculated and saved in the recording unit 6.

<Generation of Virtual Viewpoint Image>

In an image generation unit 12, an image is generated from a specified viewpoint. If a position at which the cameras 2 is installed is specified as a viewpoint, an image captured in accordance with the corresponding camera is output. However, if other than a position at which the cameras 2 is installed is specified as a viewpoint (a virtual viewpoint), the homography matrix H calculated by the processing previously described is used to generate a virtual viewpoint image.

Here, explanation is given regarding an example of a case of generating an image where the viewpoint is set between the camera 2a and the camera 2b. However, homography matrices H for between other adjacent cameras have also been calculated as described above. Therefore, the is possible to similarly generate a virtual viewpoint image between cameras, other than the camera 2a and the camera 2b.

Firstly, the image generation unit 12 reads necessary frame images (for example the image 200a) from the recording unit 6, via the data readout unit 7. Next the image generation unit 12 reads from the recording unit 6 a homography matrix H for making a coordinate conversion of the image. Here, the image before coordinate conversion is that of the camera 2a, and this image is converted to a virtual viewpoint image seen from a virtual viewpoint between the camera 2a and the camera 2b. Therefore, the image generation unit 12 reads a homography matrix H for converting an image of the camera 2a to an image of the camera 2b.

Next, the image generation unit 12 calculates coordinates after the homography conversion for each pixel of the entirety of the image of the camera 2a. Letting the coordinates of a pixel of the image of the camera 2a be (xa, ya) and the homography matrix be H, coordinates after the homography conversion (xb, yb) are calculated by the following calculation.

$$\begin{pmatrix} xb \\ yb \\ 1 \end{pmatrix} = H \begin{pmatrix} xa \\ ya \\ 1 \end{pmatrix} \quad (5)$$

Next, the virtual viewpoint image from the virtual viewpoint between the camera 2a and the camera 2b is generated. Specifically, coordinates (x', y') after a coordinate conversion are calculated by the following linear interpolation calculation, based on the calculated values of xa, ya, xb, and yb.

$$x'=xa*r+xb*(1-r) \quad (6)$$

$$y'=ya*r+yb*(1-r) \quad (7)$$

r is an interpolation coefficient and is a coefficient for deciding at what position between the camera 2a and the camera 2b to set the virtual viewpoint, and normally a value in a range of 0<r<1 is obtained. Note that a case in which r is 0 or 1 corresponds to a viewpoint from the camera 2a or the camera 2b, respectively. For example, a new image is generated by setting r=0.5, and setting pixel values at the coordinates (xa, ya) to the pixel values of the coordinates (x', y').

If the above processing is performed for all pixels of the image of the camera 2a, an image for which a precisely intermediate place between the camera 2a and the camera 2b is set as the viewpoint, as illustrated by an image 200d, is obtained. Furthermore, it is also possible to create images such that the virtual viewpoint transitions with time, by generating respective images while causing r to slightly change for each frame.

<Operation of Image Processing Apparatus>

Figure 6A:
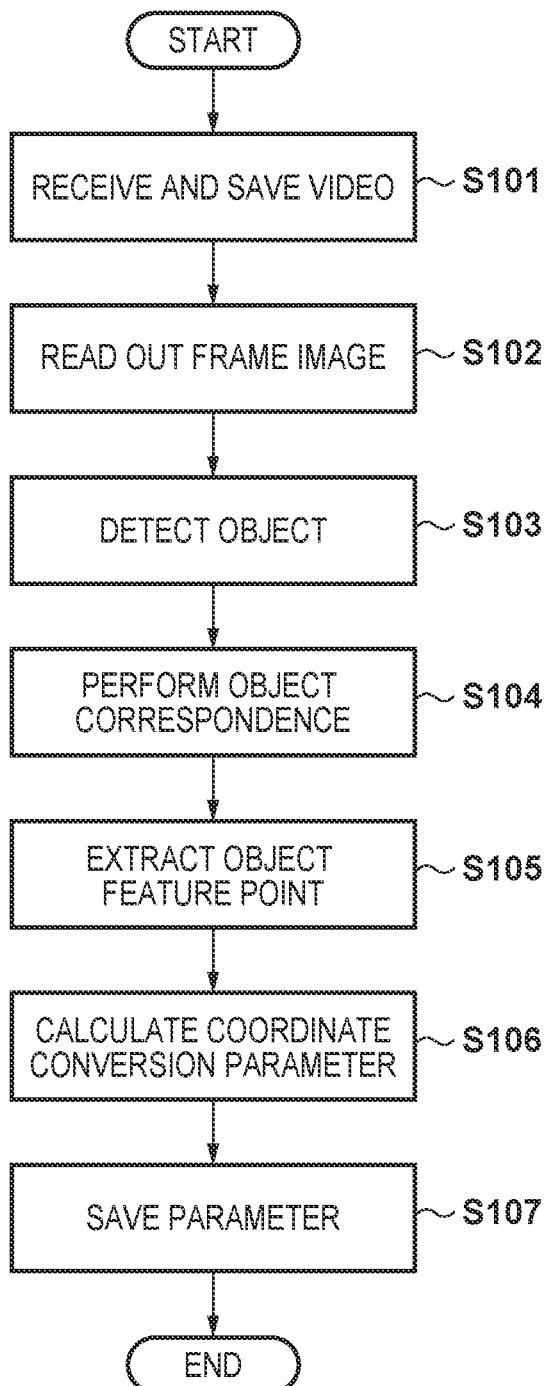
FIGS. 6A and 6B are flowcharts for explaining image processing.
Figure 6B:
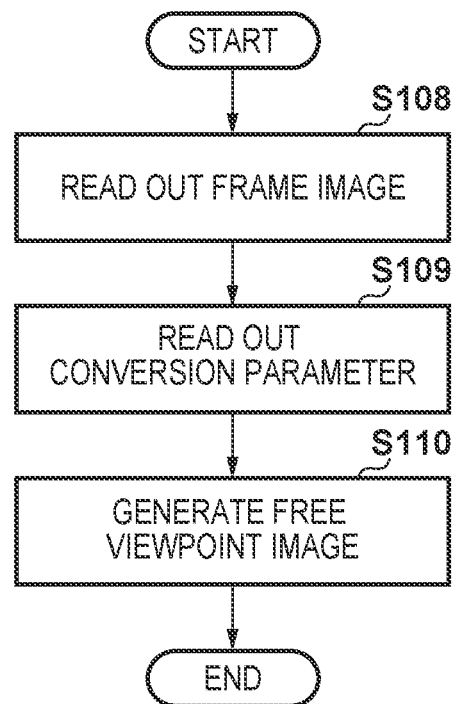

FIGS. 6A and 6B are flowcharts for explaining the above image processing. FIG. 6A illustrates processing for deriving coordinate conversion parameters, and FIG. 6B illustrates processing for generating a virtual viewpoint image. The image processing apparatus 3 is input, via the camera 2z, with a plurality of images (an image stream) from the cameras 2 as illustrated in FIG. 1.

In step S101, the data reception unit 5 receives video that has been captured by the plurality of the cameras 2, and saves it in the recording unit 6. In step S102, the data readout unit 7 reads out images necessary for nomography matrices H between cameras from a storage apparatus. For example, an image in accordance with the camera 2a (the image 200a) and an image of the same timing in accordance with the camera 2b (the image 200b) are read out.

In step S103, the object detection unit 8 performs detection of objects for each of the two read images. For example, with respect to the image 200a and the image 200b, four humans are taken as objects, and the positions and shapes are detected.

In step S104, the correspondence processing unit 9 uses a block matching method or the like to perform correspondence of objects in the two images. For example, a correspondence as illustrated by the dashed lines in FIG. 4 is performed. In step S105, the feature point detection unit 10 detects a feature point of each object in the two images. For example, coordinates of a bottom edge of an object are detected as a feature point.

In step S106, the parameter calculation unit 11 uses the result of the correspondence as described above and the coordinates of the feature point of the object to calculate a homography matrix H. In step S107, the parameter calculation unit 11 saves the calculated homography matrix H in the recording unit 6.

By executing this series of processing for each two adjacent cameras in the many cameras 2, it is possible to generate a virtual viewpoint image for any viewpoint (360 degrees in a horizontal direction).

Next, explanation is given regarding a flow for generation of a virtual viewpoint image from a virtual viewpoint that is a viewpoint other than positions at which the cameras 2 are installed that uses the homography matrix H saved in the recording unit 6.

In step S108, the image generation unit 12 reads out necessary frame images from the recording unit 6. Note that the necessary frame images are frame images in which video captured by two cameras, which sandwich a position of a virtual viewpoint of a virtual viewpoint image to generate, is included. Specifically, based on the virtual viewpoint position, two cameras are selected, and frame images captured by the two cameras are read out.

In step S109, the image generation unit 12 reads from the recording unit 6 a homography matrix H for making a coordinate conversion of the frame image. In other words, the homography matrix H between the two cameras that captured the frame images read out in step S108 is read out. In step S110, the image generation unit 12 uses the frame images read out in step S108 and the homography matrix H read out in step S109 to generate a virtual viewpoint image. Specifically, it is generated by performing coordinate conversion of the images in accordance with Equations (6) and (7) as described above.

By virtue of the first embodiment as explained above, it is possible to derive parameters for a two-dimensional coordinate conversion by using only captured video. Specifically, it is possible to derive coordinate conversion parameters between a plurality of camera images by processing having a low computation cost, and without requiring dedicated markers or the like. In addition, it is possible to suitably generate video from any viewpoint by using the derived coordinate conversion parameters.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-078436, filed Apr. 8, 2016, which is hereby incorporated by reference herein in its entirety.

What is claimed is:

1. A virtual viewpoint image generation apparatus comprising:
   one or more memories storing instructions; and
   one or more processors executing the instructions to:
      obtain position information for specifying a position of a virtual viewpoint, a first image based on image capturing by a first image capturing apparatus, and a second image based on image capturing by a second image capturing apparatus,
      perform a detection process comprising a detection of a first feature point of an object in the obtained first image and a second feature point of the object in the obtained second image,
      determine, based on the detected first feature point and the detected second feature point, a coordinate conversion parameter for converting a coordinate of the obtained first image to a coordinate of the obtained second image, and
      generate a virtual viewpoint image based on the obtained position information, the obtained first image, the obtained second image, and the determined coordinate conversion parameter,
   wherein, in the detection process, a detection of a first feature point of the object in the obtained first image and a second feature point of the object in the obtained second image is performed again in a case where a difference of a first vector specified based on a first reference point of the object in the obtained first image and the detected first feature point and a second vector specified based on a second reference point of the object in the obtained second image and the detected second feature point is greater than a predetermined difference.

2. The virtual viewpoint image generation apparatus according to claim 1,
wherein the first reference point is a centroid of the object in the first image and the second reference point is a centroid of the object in the second image.

3. The virtual viewpoint image generation apparatus according to claim 1, wherein:
an image capturing target of the first and second image capturing apparatuses is a field of a stadium,
the object is a human, and
the feature point is a foot portion of a human.

4. The virtual viewpoint image generation apparatus according to claim 1,
wherein the one or more processors further execute the instructions to:
detect an object in the first image and the second image, and
acquire correspondence information indicating a correspondence between a first detected object in the first image and a second detected object in the second-image.

5. The virtual viewpoint image generation apparatus according to claim 4,
wherein the one or more processors execute the instructions to detect the object with respect to images obtained at the same timing by the first and second image capturing apparatuses.

6. The virtual viewpoint image generation apparatus according to claim 1,
wherein the one or more processors execute the instructions to obtain the first image and the second image via a daisy-chain type topology network.

7. The virtual viewpoint image generation apparatus according to claim 1,
wherein the first vector is a vector from the first reference point to the determined first feature point and the second vector is a vector from the second reference point to the determined second feature point.

8. The virtual viewpoint image generation apparatus according to claim 1,
wherein the detection process further comprises a comparison of the first vector and the second vector and a determination whether the difference of first vector and the second vector is greater than the predetermined difference.

9. A method of controlling a virtual viewpoint image generation apparatus, the method comprising:
obtaining position information for specifying a position of a virtual viewpoint, a first image based on image capturing by a first image capturing apparatus, and a second image based on image capturing by a second image capturing apparatus;
performing a detection process comprising a detection of a first feature point of an object in the obtained first image and a second feature point of the object in the obtained second image;
determining, based on the detected first feature point and the detected second feature point, a coordinate conversion parameter for converting a coordinate of the obtained first image, to a coordinate of the obtained second image; and
generating a virtual viewpoint image based on the obtained position information, the obtained first image, the obtained second image, and the determined coordinate conversion parameter,
wherein, in the detection process, a detection of a first feature point of the object in the obtained first image and a second feature point of the object in the obtained second image is performed again in a case where a difference of a first vector specified based on a first reference point of the object in the obtained first image and the detected first feature point and a second vector specified based on a second reference point of the object in the obtained second image and the detected second feature point is greater than a predetermined difference.

10. A non-transitory computer-readable recording medium storing a program that causes a computer to execute a method for controlling a virtual viewpoint image generation apparatus, the method comprising:
obtaining position information for specifying a position of a virtual viewpoint, a first image based on image capturing by a first image capturing apparatus, and a second image based on image capturing by a second image capturing apparatus;
performing a detection process comprising a detection of a first feature point of an object in the obtained first image and a second feature point of the object in the obtained second image;
determining, based on the detected first feature point and the detected second feature point, a coordinate conversion parameter for converting a coordinate of the obtained first image to a coordinate of the obtained second image; and
generating the virtual viewpoint image based on the obtained position information, the obtained first image, the obtained second image, and the determined coordinate conversion parameter,
wherein, in the detection process, a detection of a first feature point of the object in the obtained first image and a second feature point of the object in the obtained second image is performed again in a case where a difference of a first vector specified based on a first reference point of the object in the obtained first image and the detected first feature point and a second vector specified based on a second reference point of the object in the obtained second image and the detected second feature point is greater than a predetermined difference.

11. The virtual viewpoint image generation apparatus according to claim 4,
wherein the one or more processors execute the instructions to
detect a plurality of objects from each of the first image and the second image, and
detect a first feature point from each of the plurality of detected objects in the first image, and detect a second feature point from each of the plurality of detected objects in the second image.

* * * * *